United States Patent [19]

Shinoi et al.

[11] 4,392,024
[45] Jul. 5, 1983

[54] ELECTRONIC KEY TELEPHONE SET CIRCUIT FOR PERMITTING DIALING DURING FAILURE OF COMMERCIAL POWER SUPPLIED TO THE SET

[75] Inventors: Tsuyoshi Shinoi, Yokohama; Keisuke Mochizuki; Yoshimi Suzuki, both of Kawasaki; Masaru Kudoh, Tokyo; Wataru Hashimoto, Hyogo, all of Japan

[73] Assignees: Nitsuko Limited, Kawasaki; Nippon Telegraph & Telephone Public Corporation, Tokyo, both of Japan

[21] Appl. No.: 328,451

[22] Filed: Dec. 8, 1981

[30] Foreign Application Priority Data

Dec. 25, 1980 [JP] Japan ................... 55/182790

[51] Int. Cl.³ .................. H04M 1/23; H04M 1/72
[52] U.S. Cl. ...................... 179/99 R; 179/84 VF
[58] Field of Search ........... 179/99 R, 70, 77, 84 VF, 179/16 A, 17 R, 176, 178, 90 K, 18 AD, 18 B, 18 E, 18 EA, 81 R

[56] References Cited
U.S. PATENT DOCUMENTS 4,347,409   8/1982   Ogawa et al. ................ 170/99 R

FOREIGN PATENT DOCUMENTS 5630387   3/1979   Japan .

Primary Examiner—Stafford D. Schreyer
Attorney, Agent, or Firm—Frishauf, Holtz, Goodman and Woodward

[57] ABSTRACT

An electronic key telephone set in an electronic key telephone system which is connected to the office line during the power failure by a power failure detecting relay in the key service unit having a common selection signal sender is provided with a circuit for detecting power failure to the key telephone system, additional contacts to respective keys of the key dial and a selection signal generator coupled with the additional contacts. The selection signal generator is connected to the voice signal pair line by a transistor which is turned on by a signal from the power failure detecting circuit during the power failure, and receives a D.C. power on the office line to be operable, so that a call may be generated from the key telephone set even during the power failure to the key telephone system. The signal from the power failure detecting circuit is fed to the transistor through a photo-coupler element.

5 Claims, 4 Drawing Figures

ELECTRONIC KEY TELEPHONE SET CIRCUIT FOR PERMITTING DIALING DURING FAILURE OF COMMERCIAL POWER SUPPLIED TO THE SET

BACKGROUND OF THE INVENTION

The present invention relates to an electronic key telephone set in an electronic key telephone system, and more particularly, to a key dial circuit.

Known key telephone systems of conventional design have at least one pair of conductors for each line running from the key service unit (KSU) to each station set, and accomplish switching of any selected line at the station set by means of a key or pushbutton associated with the line. Consequently, the number of conductor pairs increases as the number of central office line increases, with accompanying increases in cost of materials and labor required to effect an installation. To overcome these problems, electronic key telephone systems have been designed to effect switching at the KSU instead of in the station set, using reduced-pair cable runs to establish voice signal and data signal and power transmission paths between the KSU and each station set. In such systems, the actuation of a key or pushbutton at a station set causes transmission of data from the station set to the KSU, thereby signalling the desired service, e.g., connection to a central office (C.O.) line. The KSU might employ time division or space division techniques, or both, with relays and semiconductors being employed to implement space division.

In order to send out a selection signal, for example, a multi-frequency signal (hereinafter called "DTMF signal"), a multi-frequency signal generator circuit for generating a DTMF signal is provided in every electronic key telephone set in a known electronic key telephone system. The provision of the DTMF signal generator circuit in every key telephone set makes not only the key telephone set but also the entire key telephone system expensive.

In another known system proposed in Japanese Patent Application No. 104921/1979, the DTMF signal generator is removed from an electronic key telephone set, instead provision is made such that a digital signal corresponding to a depressed key in a key dial may be transmitted from the key telephone set onto data lines for the KSU and the DTMF signal may be sent commonly from a sender in the KSU to the C.O. line, to thereby achieve economization.

In order to maintain telephone service during power failures, a known key telephone system has additional relays in the KSU for connecting each C.O. line to a predetermined station set. However, since the key telephone set in the latter system lacks a selection signal generator circuit, any key telephone set would be unable to originate a call during power failure, and therefore, the key telephone system would become useless.

SUMMARY OF THE INVENTION

It is a general object of this invention to provide an electronic key telephone system in which during power supply a selection signal is sent out from a sender in a KSU which is common to all key telephone sets, and during power failure it is made possible to originate a call from one key telephone set or a limited small number of key telephone sets connected via break contacts of a power failure detecting relay.

It is a principal object of this invention to provide an electronic key telephone set in which generation of a selection signal is made possible during power failure to realize the object described above.

It is another object of this invention to provide the electronic key telephone set with a simple circuit formation and with low cost.

An electronic key telephone system according to this invention includes a plurality of key telephone sets each having key dial means and data signal transmitter/receiver circuit means and connected to a key service unit through a voice signal pair line and a data signal pair line, and the key service unit which has a switching matrix comprising a plurality of relay means for selectively connecting the key telephone sets to one or more office lines, additional relay means for detecting power failure and connecting the office line to a predetermined one of the key telephone sets through break contacts thereof, and means for sending a selection signal in response to a data signal from each one of the key telephone sets. The predetermined one of the key telephone sets comprises two contacts provided for each key in the key dial with one of the two contacts connected to the data transmitter/receiver circuit means, means coupled with the other contact of each key and generating a selection signal, means for detecting power failure, and means for connecting the selection signal generating means to the voice signal pair line during the power failure.

The failure detecting means and the connecting means are coupled by a photo-coupler element.

Further objects, features and other aspects of this invention will be understood from the following detailed description of preferred embodiments of this invention with respect to the accompanying drawings.

DETAILED DESCRIPTION OF PREFERRED EMBODIMENTS

Figure 1:
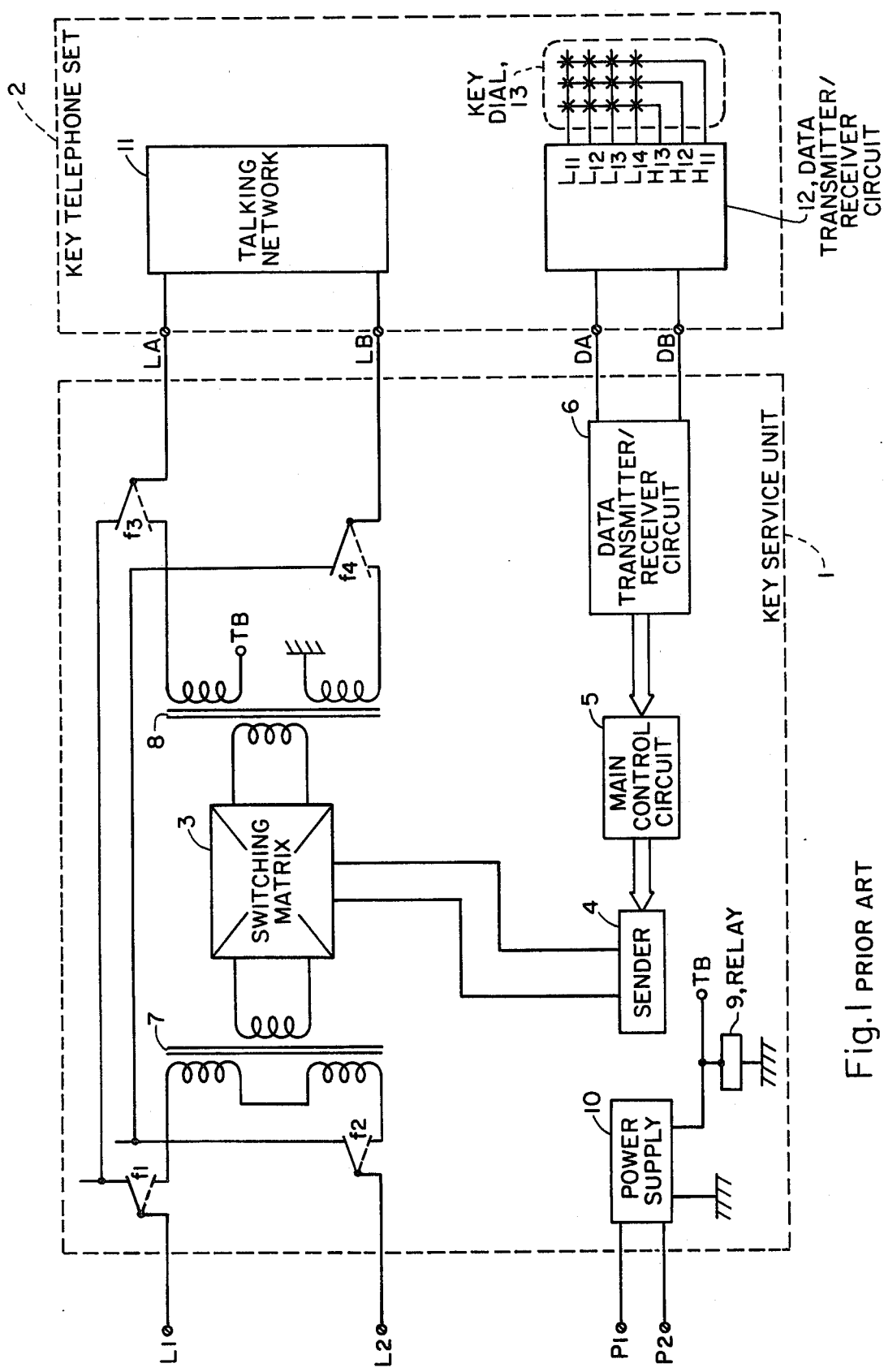
FIG. 1 is a diagrammatic view of a key telephone system in the prior art.

Referring to FIG. 1 in which a known electronic key telephone system proposed in the Japanese Patent Application No. 104921/'79 as described hereinbefore, 1 designates a main unit or a key service unit (KSU), 2 designates an electronic key telephone set, $L_1$ and $L_2$ designate an office pair line to KSU 1, 3 designates a switching matrix, 4 designates a sender of a DTMF signal, 5 designates a main control circuit, 6 designates a data transmitter/receiver circuit, 7 and 8 designate audio frequency transformers, TB designates a power supply terminal, 9 designates a relay for detecting power failure, $f_1$, $f_2$, $f_3$ and $f_4$ designate contacts of relay 9, 10 designates a power supply circuit, $P_1$ and $P_2$ designate input terminals of power supply circuit 10, 11 designates a talking network, $L_A$ and $L_B$ designate a voice signal pair line, $D_A$ and $D_B$ designate a data signal pair line, 12 designates a data transmitter/receiver circuit, 13 designates a key dial, and $L_{11}$–$L_{14}$ and $H_{11}$–$H_{13}$ designate terminals for scanning contacts in the key dial.

In a key telephone system having the arrangement, during a period when an electric power is being supplied from a commercial power line, relay 9 connected between power supply circuit 10 and the ground operates to complete a talking circuit consisting of:

office pair line $L_1$ and $L_2$—contacts $f_1$ and $f_2$—audio frequency transformer 7—switching matrix 3—audio frequency transformer 8—contacts $f_3$ and $f_4$—voice signal pair line $L_A$ and $L_B$—key telephone unit 2.

When key dial 13 is operated in the key telephone set 2, contacts of the depressed keys are actuated. Data transmitter/receiver circuit 12 detects these contacts by scanning through terminals $L_{11}$–$L_{14}$ and $H_{11}$–$H_{13}$ and sends out digital data signal corresponding to the actuated contacts onto data signal pair line $D_A$ and $D_B$. The digital data signal is received by data transmitter/receiver circuit 6 in KSU 1 and then transmitted from there to main control circuit 5. Main control circuit 5 sends a DTMF signal corresponding to the digital data signal through switching matrix 3, audio-frequency transformer 7 and relay contacts $f_1$ and $f_2$ to office pair line $L_1$ and $L_2$ by means of sender 4.

Now, if power failure occurs, for example, if the commercial power lines are interrupted in service, relay 9 is restored, and office pair line $L_1$ and $L_2$ is directly connected to voice signal pair line $L_A$ and $L_B$ of key telephone set 2 via break contacts $f_1$–$f_4$ of relay 9 as shown by solid lines in FIG. 1. However, since key telephone set 2 lacks a selection signal generator circuit, any key telephone set would be unable to originate a call during power failure, and so, this key telephone system would become useless.

In order to obviate such a shortcoming, this invention attempts to provide an electronic key telephone system wherein, during power supply operation, a selection signal is sent out from a sender in KSU which is common to all key telephone sets, and it is made possible to originate a call from one key telephone set or a limited small number of key telephone sets connected via break contacts of a power failure detecting relay during the power failure.

Figure 2:
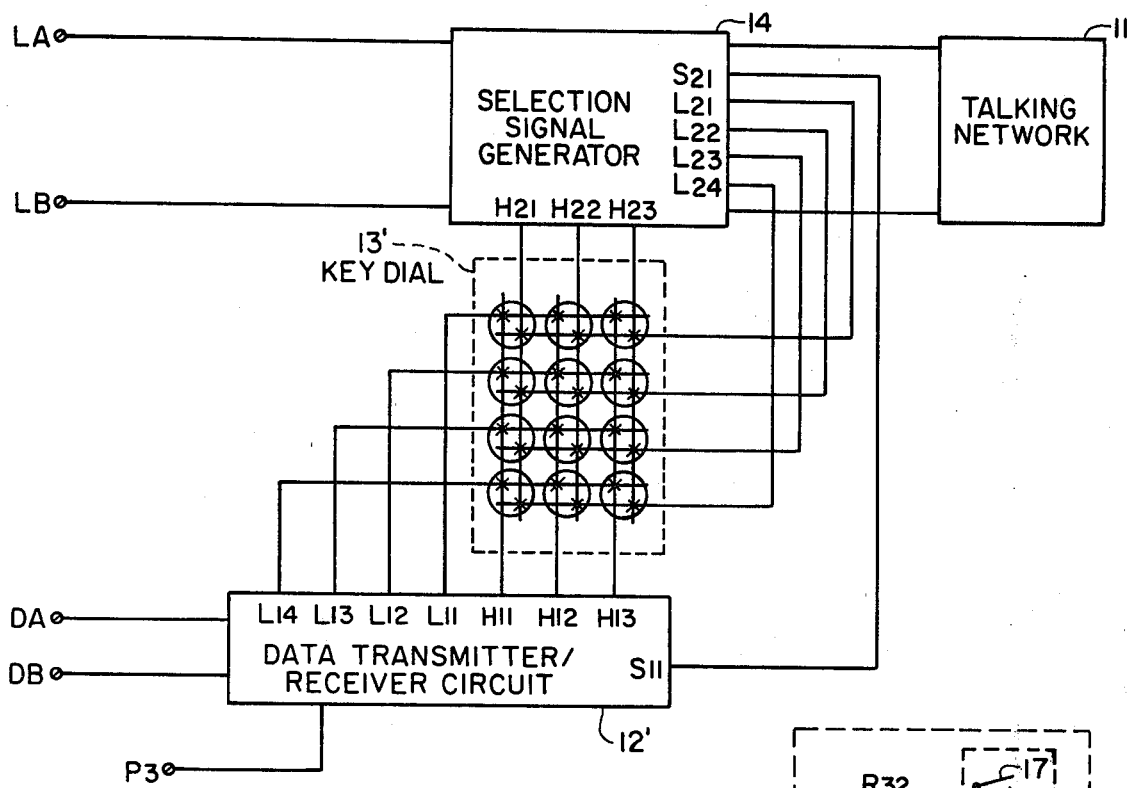
FIG. 2 is a diagrammatic view of an electronic key telephone set according to this invention.

Referring to FIG. 2 which shows an electronic key telephone set of an embodiment according to this invention, component parts similar to those in FIG. 1 are designated by the same reference characters. In the key telephone set, two contacts (each contact is represented by a mark x) are provided for each key in a key dial 13′. One set of the contacts of the keys are connected to scanning terminals $L_{11}$–$L_{14}$ and $H_{11}$–$H_{13}$ of data transmitter/receiver circuit 12′ similarly to the system shown in FIG. 1, the other set of the contacts of the keys are connected to contact scanning terminals $L_{21}$–$L_{24}$ and $H_{21}$–$H_{23}$ of a selection signal generator circuit 14. Selection signal generator circuit 14 is selectively coupled with voice signal pair line $L_A$ and $L_B$. Data transmitter/receiver circuit 12′ is supplied with an electric power from a power supply circuit (not shown) through a terminal $P_3$, and it is provided with means for detecting failure of the power supply thereto to output a power failure detecting signal from a terminal $S_{11}$ during the power failure. Selection signal generating circuit 14 is provided with a terminal $S_{21}$ for receiving the power failure detecting signal and it has means for connecting itself to voice signal pair line $L_A$ and $L_B$ when the power failure detecting signal is input to terminal $S_{21}$.

In the arrangement, if an electric power is being supplied to terminal $P_3$, the power failure detecting signal is not transmitted from terminal $S_{11}$ to terminal $S_{21}$ of selection signal generator circuit 14. At this condition, when key dial 13′ is operated, for example, when a numeral key "1" is depressed, the corresponding two contacts are closed. Data transmitter/receiver circuit 12′ detects the number "1" through the terminals $H_{11}$ and $L_{11}$ and transmits the corresponding digital data signal onto data pair line $D_A$ and $D_B$. On the other hand, selection signal generating circuit 14 is not connected to voice signal pair line $L_A$ and $L_B$ and does not generate a selection signal because it does not receive a power failure detecting signal through its terminal $S_{21}$.

If power failure occurs, or if the power supply to terminal $P_3$ is interrupted, the power failure detecting signal is transmitted from terminal $S_{11}$ to terminal $S_{21}$. Therefore, selection signal generator circuit 14 is connected to voice signal pair line $L_A$ and $L_B$. On ther other hand, voice signal pair line $L_A$ and $L_B$ is connected to office pair line $L_1$ and $L_2$ through break contacts ($f_1$–$f_4$ in FIG. 1) of the power failure detecting relay (9 in FIG. 1). So that an electric power is supplied to selection signal generator circuit 14 from the office through voice signal pair line $L_A$ and $L_B$ and selection signal generator circuit 14 becomes operable. At the condition, if the key dial 13′ is depressed, for example, if a key of number "1" is depressed, selection signal generator circuit 14 detects the number "1" through terminals $L_{21}$ and $H_{21}$ and transmits the corresponding selection signal to voice signal pair line $L_A$ and $L_B$. On the other hand, data transmitter/receiver circuit 12′ does not operate because it is not supplied with an electric power, and thus it would transmit no data signal onto data signal pair line $D_A$ and $D_B$.

When such a key telephone set is used as at least one of the key telephone sets in the electronic key telephone system as shown in FIG. 1, the problem that it becomes impossible to originate a call from this key telephone system during power failure can be resolved, while obviating the bad economy of providing a selection signal generator circuit in every key telephone set.

Figure 3:
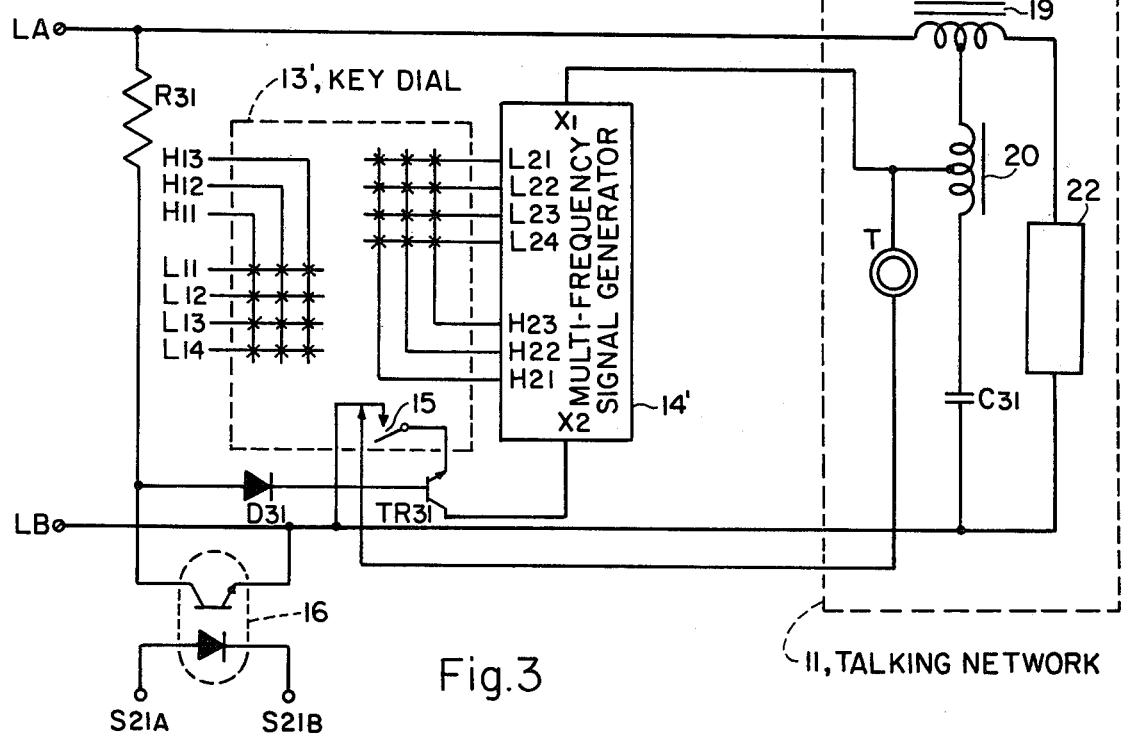
FIG. 3 is a circuit diagram showing an embodiment of this invention.

Referring to FIG. 3, an embodiment shown has a multi-frequency signal generator circuit 14′ as a selection signal generator circuit. Component parts equivalent to those shown in FIG. 1 and FIG. 2 are designated by the same reference symbols. The data transmitter/receiver circuit is omitted from illustration, for simplicity of the figure. Multi-frequency signal generator circuit 14′ is connected to voice signal pair line $L_A$ and $L_B$ through a common contact 15 of key dial 13′ and a switching transistor $TR_{31}$. A photo-transistor of a photo-coupler 16 is connected in series with a resistor $R_{31}$ and they are connected between lines $L_A$ and $L_B$. A light emitting diode of photo-coupler 16 is connected to terminals $S_{21A}$ and $S_{21B}$ corresponding to terminal 21 in FIG. 2. When a current is fed to the light emitting diode of photo-coupler 16 from terminal $S_{11}$ of data transmitter/receiver circuit 12′ in FIG. 2, the light emitting diode in photo-coupler 16 emits light. Then, the phototransistor of photo-coupler 16 turns on. A common connecting point of resistor 31 and the photo-transistor of photo-coupler 16 is connected to a base of transistor $TR_{31}$ through a diode $D_{31}$. Talking network 11 includes another common contact 17 of key dial 13′, a receiver 18, a resistor $R_{32}$, transformers 19 and 20 forming a bridge type two-wire/four-wire converter circuit, a transmitter T, a balance circuit 22 and a capacitor $C_{31}$.

In the circuit arrangement, when an electric power is being supplied to data transmitter/receiver circuit 12′

(FIG. 2), a D.C. current flows from terminal $S_{21A}$ to terminal $S_{21B}$, and hence the photo-transistor of photo-coupler 16 turns on. As a result, the circuit consisting of diode $D_{31}$-base-emitter path of transistor $TR_{31}$—common contact 15 is short-circuited by the photo-transistor. Therefore, the D.C. current from voice signal pair line $L_A$ and $L_B$ is prevented from being fed to transistor $TR_{31}$ and diode $D_{31}$, and transistor $TR_{31}$ is thereby held off. As a result, even if key dial 13' is operated and common contact 15 is closed, multi-frequency signal generator 14' is not connected to voice signal pair line $L_A$ and $L_B$. Accordingly, an electric power is not supplied to multi-frequency signal generator 14', and hence no multi-frequency signal would be sent onto voice signal pair line $L_A$ and $L_B$.

When an electric power is not supplied to data transmitter/receiver circuit 12' (FIG. 2) due to power failure, no current flows through the light emitting diode of photo-coupler 16 via terminals $S_{11}$, $S_{21A}$ and $S_{21B}$ from data transmitter/receiver circuit 12' in FIG. 2. Therefore, the photo-transistor in the photo-coupler becomes non-conducting. In the condition, when common contact 15 is closed in response to operation of key dial 13', the D.C. current fed to voice signal pair line $L_A$ and $L_B$ from the office line flows through the base-emitter path of transistor $TR_{31}$ via resistor $R_{31}$ and diode $D_{31}$, so that transistor $TR_{31}$ is turned on. As a result, multi-frequency signal generator 14' is connected to voice signal pair line $L_A$ and $L_B$ at its terminals $X_1$ and $X_2$ and receives power supply. Therefore, multi-frequency generator 14' is operable in response to the currently depressed key, for instance, the numeral "1" key in key dial 13', that is, it detects number "1" through terminals $L_{21}$ and $H_{21}$ and generates the corresponding DTMF signal from terminals $X_1$ and $X_2$. The DTMF signal is sent onto voice signal pair line $L_A$ and $L_B$ through transformer 20, transistor $TR_{31}$ and common contact 15.

It will be understood that resistor $R_{31}$, diode $D_{31}$, transistor $TR_{31}$ and photo-coupler 16 form a circuit for inhibiting operation of multi-frequency signal generator circuit 14' during a period when an electric power is being supplied to the key telephone system but for connecting multi-frequency signal generator circuit 14' to voice signal pair line $L_A$ and $L_B$ during another period when the electric power is not supplied to the key telephone system.

Thus, use of the key telephone set of FIG. 3 enables to generate a call from the key telephone system even when power failure is caused.

Figure 4:
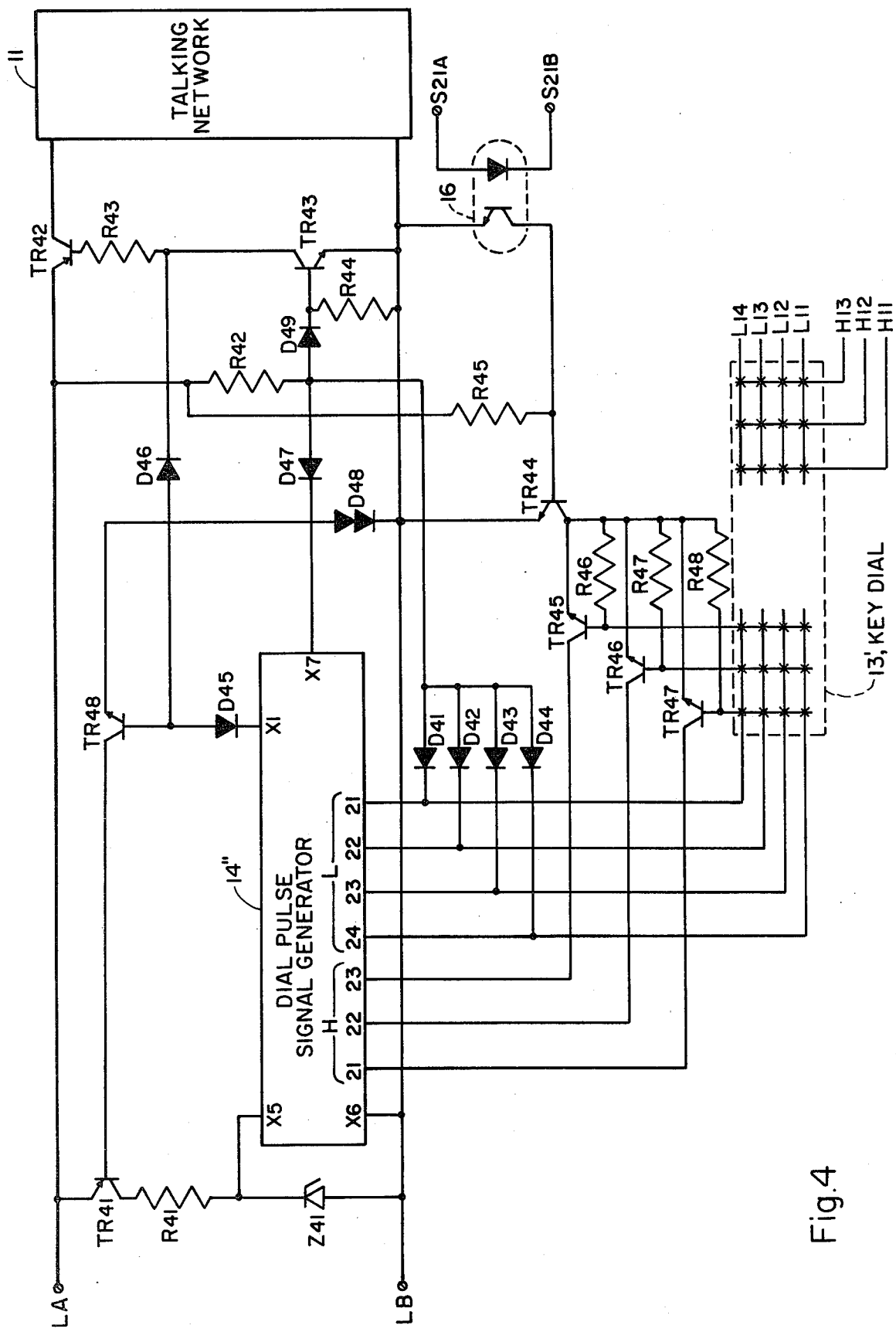
FIG. 4 is a circuit diagram showing another embodiment of this invention.

Referring to FIG. 4, another embodiment shown includes a dial pulse signal (DP signal) generator circuit 14" as a selection signal generator circuit, and component parts similar to those shown in FIGS. 1-3 are designated by the same reference symbols. DP signal generator circuit 14" has its power supply terminals designated by $X_5$ and $X_6$ and is provided with scanning terminals $L_{21}$-$L_{24}$ and $H_{21}$-$H_{23}$ for key dial contacts. When a set of an L terminal and an H terminal takes a low level, it generates a predetermined number of pulses from a terminal $X_1$ depending upon the combination of the L and H terminals taking the low level, and holds a signal at a terminal $X_7$ at a low level during the period when the pulses are being generated.

DP signal generator circuit 14" is selectively connected to voice signal pair line $L_A$ and $L_B$ through a resistor $R_{41}$ by a transistor $TR_{41}$ to receive D.C. power from voice signal pair line $L_A$ and $L_B$ with a constant voltage defined by a zener diode $Z_{41}$.

Transistors $TR_{42}$ and $TR_{43}$, resistors $R_{42}$, $R_{43}$ and $R_{44}$ and diode $D_{49}$ form a circuit for connecting talking network 11 to voice signal pair line $L_A$ and $L_B$, and transistor $TR_{43}$ is normally on, and accordingly, transistor $TR_{42}$ is on. Transistors $TR_{44}$, $TR_{45}$, $TR_{46}$, $TR_{47}$ and $TR_{48}$, photo-coupler 16, diodes $D_{41}$, $D_{42}$, $D_{43}$, $D_{44}$, $D_{45}$, $D_{46}$, $D_{47}$ and $D_{48}$, and resistors $R_{45}$, $R_{46}$, $R_{47}$ and $R_{48}$ form a circuit for controlling on-off operation of transistors $TR_{41}$ and $TR_{43}$ and application of a low level signal to terminals $L_{21}$-$L_{24}$ and $H_{21}$-$H_{23}$ of DP signal generator circuit 14" in response to operation of key dial 13'.

Assuming now that an electric power is being supplied to the key telephone system so that a current is flowing through the light emitting diode of photo-coupler 16 from terminal $S_{21A}$ to terminal $S_{21B}$, the photo-transistor in photo-coupler 16 is conducting to short-circuit the base-emitter path of transistor $TR_{44}$. Accordingly, transistor $TR_{44}$ is non-conducting.

Upon the condition, when a key in key dial 13', for example, the numeral "1" key is depressed, any one of transistors $TR_{45}$-$TR_{47}$ is non-conducting because of the non-conducting state of transistor $TR_{44}$ and a voltage at any one of scanning terminals $L_{21}$-$L_{24}$ and $H_{21}$-$H_{23}$ makes no change, so that dial pulse generator circuit 14" does not generate a dial pulse. Moreover, since transistor $TR_{41}$ is kept non-conducting, DP signal generator circuit 14" is not supplied with an electric power and thus does not operate.

Upon power failure, since the photo-transistor in photo-coupler 16 becomes non-conducting so that the base of transistor $TR_{44}$ is biased via resistor $R_{45}$, transistor $TR_{44}$ is held conducting.

Under the condition, when the numeral "1" key is depressed, a current flows from a line $L_A$ to the other line $L_B$ of the voice signal pair line through resistor $R_{42}$, diode $D_{41}$, a key contact of the depressed key, base-emitter path of transistor $TR_{47}$, and transistor $TR_{44}$, and hence transistor $TR_{47}$ becomes conducting. At a time, scanning terminals $L_{21}$ and $H_{21}$ take a low level. On the other hand, due to the fact that a current flows from line $L_A$ to line $L_B$ through diode $D_{41}$, contact of the depressed key, resistor $R_{48}$ and transistor $TR_{44}$, transistor $TR_{43}$ is turned off. Accordingly, transistor $TR_{42}$ is also turned off. Due to the off condition of transistor $TR_{43}$, transistor $TR_{48}$ is turned on, thereby transistor $TR_{41}$ is turned on. Therefore, an electric power is supplied to DP signal generator circuit 14" from voice signal pair line $L_A$ and $L_B$ via resistor $R_{41}$, through terminals $X_5$ and $X_6$.

As a result, DP signal generator circuit 14" generates a dial pulse representing "1" from terminal $X_1$, owing to the fact that both scanning terminals $L_{21}$ and $H_{21}$ have taken a low level, and also holds terminal $X_7$ at a low level during the generation of the dial pulse. Transistor $TR_{48}$ is momentarily turned off in response to generation of a dial pulse, thereby transistor $TR_{41}$ is also momentarily turned off. A dial pulse, thus, is transmitted through voice signal pair line $L_A$ and $L_B$. Thereafter, as the low level of terminal $X_7$ is released, transistor $TR_{43}$ is turned on, and transistor $TR_{42}$ is accordingly turned on. The initial condition is thus restored.

When key dial 13' is operated subsequently, DP signals corresponding in number to the depressed keys are generated from terminal $X_1$ in a similar operation, and are transmitted onto voice signal pair line $L_A$ and $L_B$ by repetition of on-off operation of transistor $TR_{41}$.

Here, it will be understood that it is able to generate a call from the key telephone system using the key telephone set of FIG. 4, even if the electric power is not supplied to the key telephone system.

While this invention has been described above in connection with preferred embodiments, subsidiary circuitries which are irrelevant to the subject matter of this invention such as a hook switch of a telephone set, a diode bridge for matching polarity of a talking current, etc., were omitted in the embodiments shown, for simplicity of the illustration and the description.

As described above, according to this invention, an electronic key telephone set is obtained which transmits key dial information through data lines to a KSU during power supply and which can transmit a selection signal directly onto voice signal pair line during power failure. Therefore, if it is used as one or a limited number of key telephone sets in an electronic key telephone system adapted to transmit a selection signal from a sender in the KSU as described previously, there exists a merit that the shortcoming of being impossible to originate a call during power failure can be obviated while retaining economy of the key telephone system.

What is claimed is:

1. In an electronic key telephone system including a plurality of key telephone sets each having key dial means and data signal transmitter/receiver circuit means and connected to a key service unit through a voice signal pair line and a data signal pair line, and said key service unit which has a switching matrix comprising a plurality of relay means for selectively connecting said key telephone sets to one or more office lines, additional relay means for detecting commercial power failure to said sets and connecting each office line to a respective predetermined one of said key telephone sets through break contacts thereof, and means for sending a selection signal in response to a data signal from each one of said key telephone sets, the improvement which comprises said respective predetermined one of said key telephone sets comprising two contacts provided for each key in said key dial with one of said two contacts connected to said data transmitter/receiver circuit means, means coupled with the other contact of each key and generating a selection signal, means for detecting power failure, and means for connecting said selection signal generating means to said voice signal pair line during the power failure.

2. An electronic key telephone set in an electronic key telephone system having a key service unit, which comprises:
two contacts provided for each key in a key dial;
data signal transmitter/receiver circuit means connected with one of said two contacts of each key;
selection signal generator circuit means connected to the other of said two contacts of each key to generate a selection signal corresponding to the key;
means for detecting commercial power failure; and
means for connecting said selection signal generator circuit means to a voice signal pair line during the commercial power failure.

3. The electronic key telephone set as claimed in claim 2, wherein said power failure detecting means and said connecting means are coupled by a photo-coupler element.

4. The electronic key telephone set as claimed in claim 2, wherein said selection signal generator circuit means are a multi-frequency signal generator circuit, said connecting means include a transistor through which said multi-frequency signal generator circuit is connected to said voice signal pair line, and said transistor is turned off when a signal representing the power supply is present from said power failure detecting means.

5. The electronic key telephone set as claimed in claim 2, wherein said selection signal generator circuit means are a dial pulse signal generator circuit, said connecting means include a transistor through which said dial pulse signal generator circuit is connected to said voice signal pair line, and said transistor is turned off when a signal representing the power supply is present from said power failure detecting means.

* * * * *